Sept. 20, 1971      B. S. APPLETON      3,606,295

SHOCK ABSORBER

Filed Oct. 17, 1969      4 Sheets-Sheet 1

INVENTOR
BERNARD S. APPLETON
BY *Clell W* 
ATTORNEY

Sept. 20, 1971   B. S. APPLETON   3,606,295
SHOCK ABSORBER
Filed Oct. 17, 1969   4 Sheets-Sheet 2
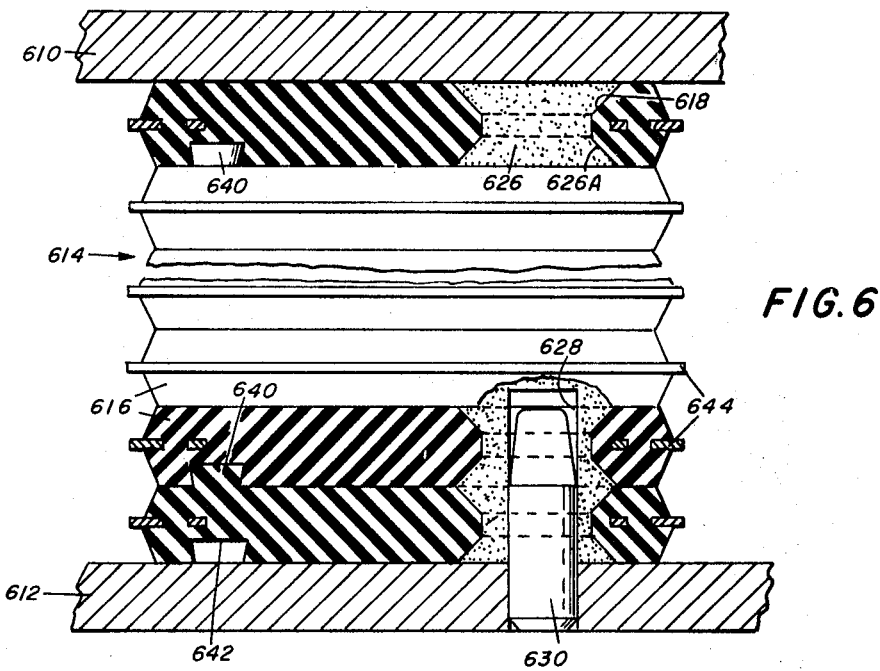
FIG. 6
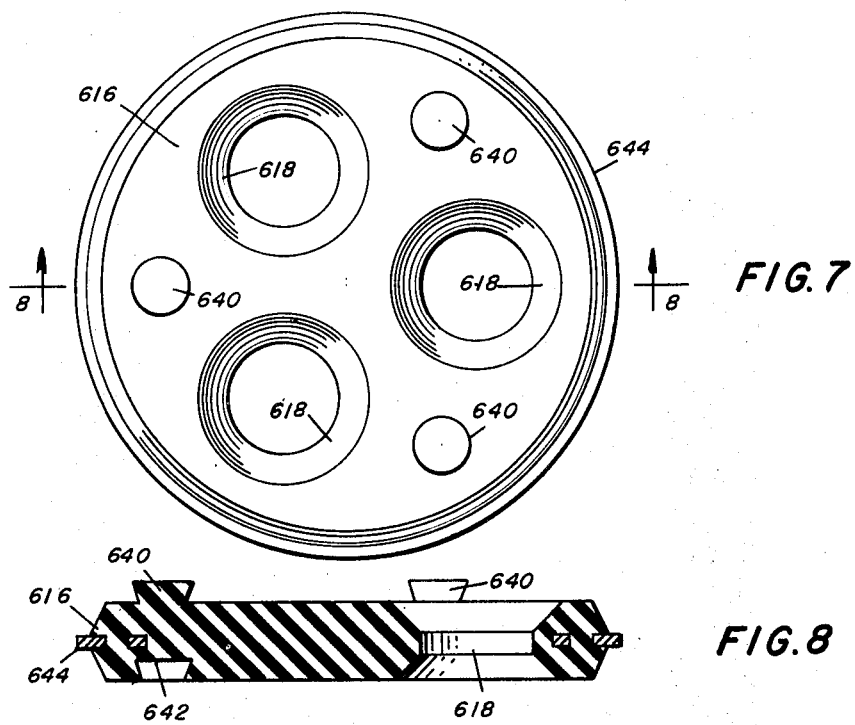
FIG. 7
FIG. 8
INVENTOR
BERNARD S. APPLETON
ATTORNEY Sept. 20, 1971  B. S. APPLETON  3,606,295
SHOCK ABSORBER Filed Oct. 17, 1969  4 Sheets-Sheet 3

INVENTOR
BERNARD S. APPLETON
BY
ATTORNEY

United States Patent Office 3,606,295
Patented Sept. 20, 1971

3,606,295
SHOCK ABSORBER
Bernard Simon Appleton, Woodmere, N.Y., assignor to Unilan A.G., Chur, Switzerland
Filed Oct. 17, 1969, Ser. No. 867,216
Claims priority, application Italy, Nov. 12, 1968, 53,852A/68
Int. Cl. B60g 11/22; B61g 11/00; F16f 1/36
U.S. Cl. 267—63     12 Claims

ABSTRACT OF THE DISCLOSURE

A spring or shock absorber adapted for vehicle suspension systems and the like comprising a stack of elastomeric discs lying one on the other and an axially extending bore through the stack filled with a flexible plastic foam which joins the discs together into a unitary structure.

---

This invention relates generally to spring complexes and more particularly to a novel stack of elastomeric discs adapted to compress and act as a spring, shock absorber or the like for vehicles.

It has been proposed heretofore to fabricate a spring by stacking alternate rubber or other elastomeric discs and metal plates. A central bore is provided through the stack to center the discs and plates and to provide means for the discs to expand radially both inwardly and outwardly while sliding over the metal plates. It is possible to vary the damping or the elastic effect by selection of the rubber composition of the discs. However, discs formed of rubber having high damping properties (hysteresis) have low elasticity and readily undergo permanent deformation while discs made of highly elastic rubber have poor damping properties. Consequently, the heretofore available springs made with rubber discs have had the disadvantage of not combining good damping with good elastic properties.

A spring using the alternate rubber discs and metal plates has the further disadvantage that the plates must project both inwardly and outwardly beyond the uncompressed discs a distance at least equal to the amount of expansion of the discs when compressed. Such a construction does not permit confinement of the rubber disc-metal plate in a container to limit expansion of the discs and thereby increase the compression load of the spring. This is particularly disadvantageous when making railway buffers or bumpers.

A still further disadvantage of the heretofore known springs employing rubber discs as the elastic element is that it has often been necessary for them to be assembled and calibrated while being installed on the vehicle, thus, making it impossible to furnish a package prepared under the expert guidance of the manufacturer. Furthermore, such systems require frequent maintenance and adjustments because of compression set of the rubber discs.

Of course, it would be easier to make use of a single rubber molded part of unitary structure but, owing to the so-called "shape factor," it would be impossible to obtain significant deformations without causing excessive strains in the outside surface of the part. The use of alternate rubber discs and metal plates prevents the above-mentioned strains thereby making it possible to use relatively thin elastic elements and combine their single deformations. The system requires, nevertheless, a combination of an elastic material with a non-elastic material with consequent friction between the elastic material and non-elastic material as well as an assembly of the parts to make the spring element.

It is an object of this invention to provide a spring assembly embodying elastomeric discs which is devoid of the foregoing disadvantages. Another object of the invention is to provide an improved spring complex made entirely of elastic materials with substantially unlimited flexibility and which does not require assembly of prefabricated parts for its manufacture. Another object of the invention is to provide an improved spring complex with both a predetermined elastic and damping effect. Still another object of the invention is to provide a spring complex of rubber or other elastomeric discs substantially free from permanent deformation or compression set. A still further object of the invention is to provide a spring complex having a plurality of rubber discs adapted to be enclosed in a container which avoids excessive expansion of the discs. A more specific object of the invention is to provide a spring complex which can be fabricated by a manufacturer and sold to the consumer for use without modification or complicated installation. A still further object is to provide a spring complex having a stack of rubber or similar elastomeric discs having improved and predetermined elastic and damping properties.

Other objects will become apparent from the following description with reference to the accompanying drawing in which FIG. 1 is an axial section of one embodiment of the vention adapted to replace a rubber spring;

FIG. 6 is an axial section of another embodiment of the invention;

FIG. 7 is a plan view of the embodiment of FIG. 6;

FIG. 8 is an axial section of one disc of the stack of the embodiment of FIG. 6 taken along the line VIII—VIII of FIG. 7;

Figure 1:
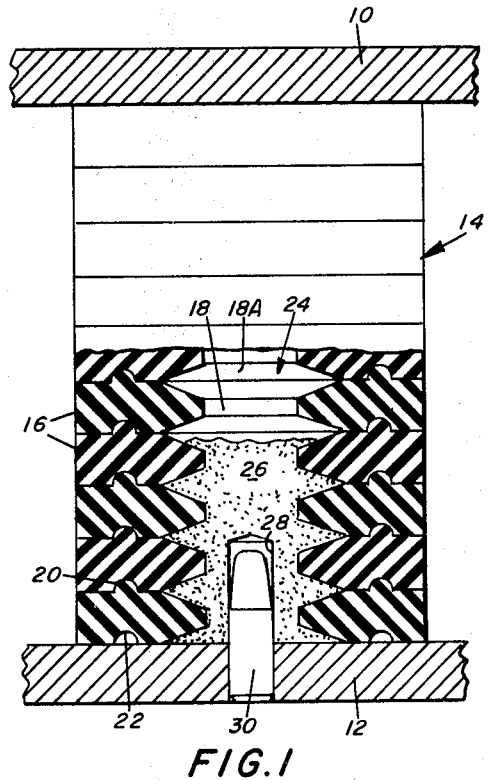

The foregoing objects and others are accomplished in accordance with this invention, generally speaking, by providing a spring complex having a stack of substantially non-porous elastomeric discs lying one on the other in face to face relationship, each disc having at least one hole therethrough aligned with a hole in adjacent discs forming a bore axially through the stack, the bore being substantially filled with a flexible plastic foam which forms a column or core extending axially through the stack. The flexible plastic foam or cellular core is continuous through the stack and joins the discs into a unitary structure. The cellular core has a lower modulus of elasticity, lower damping coefficient and a higher degree of resilience than the discs.

It is preferred that the core be a flexible micro-cellular polyurethane. Best results are obtained with a partially closed cell flexible microcellular polyurethane having a density of at least about 20 pounds per cubic foot. One suitable cellular polyurethane of this type is disclosed in U.S. Pat. 2,850,464. Other suitable polyurethane foams and methods for making them are disclosed in "Polyurethanes: Chemistry and Technology" by Saunders and Frisch, published by Interscience Publishers 1964), particularly Chapters V, VI and VII.

A typical formulation for a reaction mixture which will react and expand into a suitable cellular core contains about 100 parts by weight hydroxyl polyester prepared from adipic acid and ethylene glycol and having a molecular weight of about 2000, a hydroxyl number of about 56 and an acid number of less than 10, about 24 parts 1,5-naphthylene diisocyanate, about 2.1 parts 50 percent aqueous solution of sulfonated castor oil, about 0.15 part paraffin oil and about 1.25 parts dimethylsilicone oil.

The discs may be any suitable elastomer such as, for example, natural or synthetic rubber or polyurethane elastomer and the invention contemplates all types of suitable substantially non-porous elastomeric polymers. In fact, various elastomeric materials may be used for either the non-porous disc or the cellular core. However, it is preferred to use rubber discs and a cellular polyurethane core so the following description is largely with respect to this preferred combination but it is to be understood that other suitable non-porous and porous elastomers can be used.

Preferably, the resilience (Yerzley) of the rubber disc is within the range of from about 5% to about 25% while the resilience of the cellular core is above about 50%. Preferably, the damping coefficient of the rubber disc is from about 15 to about 40 kg./sec./m. and the damping coefficient of the cellular core is from about 3 to about 10 kg./sec./m. It is also preferred that the rubber discs have a Young's modulus of from about 40 to about 200 kg./cm.$^2$ and that the cellular core have a Young's modulus of from about 5 to about 25 kg./cm.$^2$.

In constructing a spring complex in accordance with the invention, the configuration of the core influences the properties of the spring. The shape of the openings or holes through the thickness of the discs is such that spaced angular undercut enlargements of the core are provided. The cellular core or nucleus elastically impedes radial expansion of the rubber discs inwardly as a load is applied. Furthermore, as the load is withdrawn the cellular core will urge the rubber discs to contract and tend to prevent permanent deformation of the discs. Those portions of the core extending radially into the undercuts between discs provide furthermore an elastic surface component between parts of the discs lying one on the other which assist elastic recovery of the stack as the load decreases. The compression and shock absorption properties of the spring complex can be varied by variation in the design of the core.

Referring now to the drawing, FIG. 1 is an axial section of one embodiment of the invention having a stack 14 or rubber discs 16 lying one on the other in face to face relationship between rigid metal plates 10 and 12. Plates 10 and 12 represent the suspended and nonsuspended part of a suspension system. Each of rubber discs 16 is provided with a central hole or opening 18. As shown in the drawing, each hole flares outwardly adjacent each surface of the disc 16 and joins with a similar flare in an adjacent surface of the neighboring disc 16 to form an undercut 18A between the discs 16. Discs 16 have the general appearance of one having a bore therethrough which has been countersunk on each side. That portion of disc 16 between the undercuts 18A has a frusto-conical shape in cross-section. An apex angle of from about 120° to about 150° is preferred for the undercut. Discs 16 lie one on the other and are centered with respect to each other by means of a circular rib 20 on one face of a disc 16 fitting into a corresponding circular groove 22 in the opposing face of the neighboring disc lying thereon. The diameter of the rib 20 and of groove 22 preferably corresponds to the diameter of the "neutral fiber" of disc 16. That is, it corresponds to the annular area marking the limit between the internal compressed and the external expanded parts of disc 16 while stack 14 is under axial compression. As shown in FIG. 1, the flared portions of the hole 18 are located within the diameter of the compressed part of disc 16.

The holes 18 through the discs 16 are aligned axially to form a bore 24 extending through stack 14. The bore 24 has axial spaced undercuts 18A of substantially wedge-shaped cross-section. Bore 24 is substantially filled with a microcellular flexible polyurethane foam core 26 by pouring a liquid foamable reaction mixture into the bore and permitting it to react and expand into a cast cellular polyurethane which fills the bore including the wedge-shaped enlargements in undercuts 18A. The solid core 26 filling bore 24 joins the discs 16 together to form a unitary structure. A cavity 28 is provided in core 26 adjacent metal plate 12. Metal pin 30 fixed in metal plate 12 extends into the cavity 28 to act as a centering pin for the stack 14. The same type of centering system can be provided for the upper part of stack 14, if desired.

In casting the microcellular polyurethane core 26, discs 16 are stacked in a mold in the arrangement shown in FIG. 1 and a predetermined quantity of a suitable foamable reaction mixture is poured into bore 24. Both ends of bore 24 are sealed, one with the bottom of the mold and the other by placing a metal plate thereover which remains in place until foaming and expansion of the mixture into a solid microcellular polyurethane foam has occurred. The resulting stack 14 of rubber discs 16 having core 26 is preferably postcured in an oven where further reaction occurs with cross-linking or reticulation of the foam. The particular formulation will vary depending upon the properties desired in the product. In each case, the core becomes bonded to the rubber of the discs 16 of the stack 14 binding the discs 16 together into a unitary structure.

TABLE I

|  | Rubber discs | | | | Foam core: Low-damping microcellular expanded material Type— | |
|---|---|---|---|---|---|---|
|  | High-damping elastomer Type— | | Medium-damping elastomer Type— | | | |
|  | A | B | C | D | E | F |
| Hardness, Shore A | 52 | 80 | 53 | 76 | | |
| Ultimate tensile stress, kg./cm.$^2$ | 144 | 114 | 150 | 188 | 34 | 73 |
| Ultimate elongation, percent | 750 | 300 | 590 | 420 | 340 | 470 |
| Resilience (Yerzley), percent | 14 | 11 | 25 | 16 | 59 | 55 |
| Compression set, percent | 34 | 31 | 25 | 17 | [1] 3 | [1] 7 |
| Young's modulus (static), kg./cm.$^2$ | 17 | 70 | 21 | 48 | 3.5 | 7.5 |
| Resonance frequency, Hz | 60 | 116 | 61 | 97 | 28 | 41 |
| Dynamic rigidity, kg./m | 22,400 | 84,500 | 23,150 | 58,500 | 4,700 | 10,450 |
| Damping coefficient, kg./sec./m | 25 | 33 | 18 | 24 | 5 | 5 |
| Loss factor, tan | 0.43 | 0.29 | 0.30 | 0.25 | 0.18 | 0.12 |
| Loss angle, degrees | 23 | 16 | 17 | 14 | 10 | 7 |
| Young's modulus (dynamic), kg./cm.$^2$ | 51 | 186 | 50 | 128 | 9 | 20 |
| Damping percent (Roelig), percent | 47 | 35 | 37 | 32 | 24 | 18 |

[1] At room temperature (about 20° C.).

In operation, when the stack 14 is compressed between rigid plates 10 and 12 by increase of an applied load, part of the energy is accumulated in elastic form in core 26 including that part forming the enlargement in undercut 18A as discs 16 are compressed axially and expand radially toward core 26. Hence, at this stage, the core shares in bearing the applied load. As the load is withdrawn, the elastic energy accumulated in core 26 will tend to urge return of the internal part of disc 16 to its uncompressed position and to urge the stack 14 back to its uncompressed height as the enlargements in undercut 18A return to their uncompressed state. The effect of the two forces is to oppose permanent deformation of the discs.

The spring complex of FIG. 1 need not be extremely large to serve in suspension systems of vehicles. For example, a stack having an outside diameter of about 185 centimeters, about 175 centimeters high and weighing about 4870 grams can be used to advantage in the suspension system of a railroad car. Of the total weight, about 520 grams is microcellular polyurethane foam.

Figure 2:
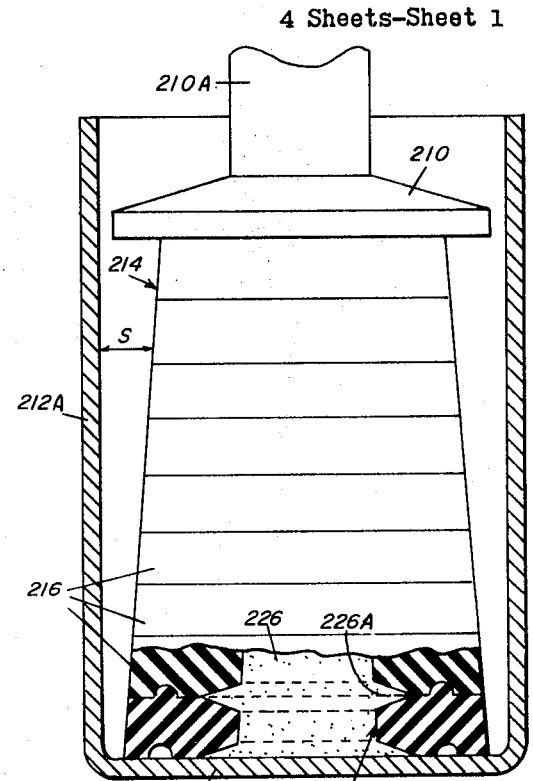
FIG. 2 is an axial section of one embodiment of the invention adapted to be used as a shock absorber on a vehicle.

The embodiment of FIG. 2 is a shock absorber having a stack 214 of rubber discs 216, a core 226 filling bore 224 and undercut enlargements 226A. A rigid cylindrical container 212A has closed end 212 against which stack 214 is compressed as a load is applied through rod 210A and plate 210. Stack 14 is frusto-conically shaped with its base adjacent closed end 212. Core 226 is tapered with its outer surface substantially parallel to the external wall of stack 214. Stack 214 and core 226 are of greater cross-section at the base than at the apex. With this configuration, and in the "at rest" condition shown in FIG. 2, the radial distance S between the outside wall of stack 224 and the inside wall of container 212A increases gradually from base 212 to plate 210. The radial distance between each disc 216 and the wall of container 212A is chosen so that discs 216 expand under load progressively into contact with the wall of container 212A beginning with the one adjacent base 212 and continuing one after the other to the one adjacent plate 210.

Figure 4:
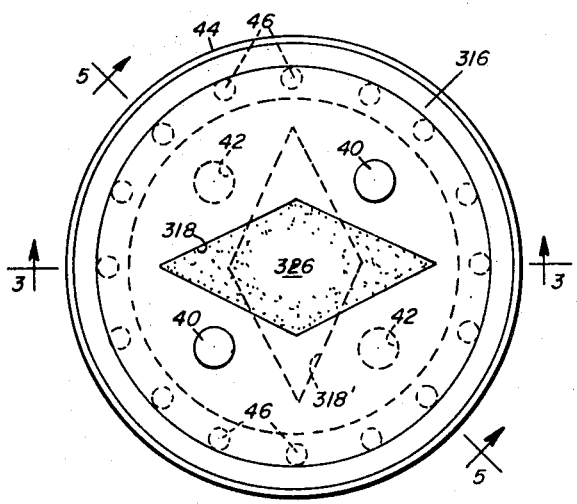
FIG. 4 is a plan view of the embodiment of FIG. 3.
Figure 3:
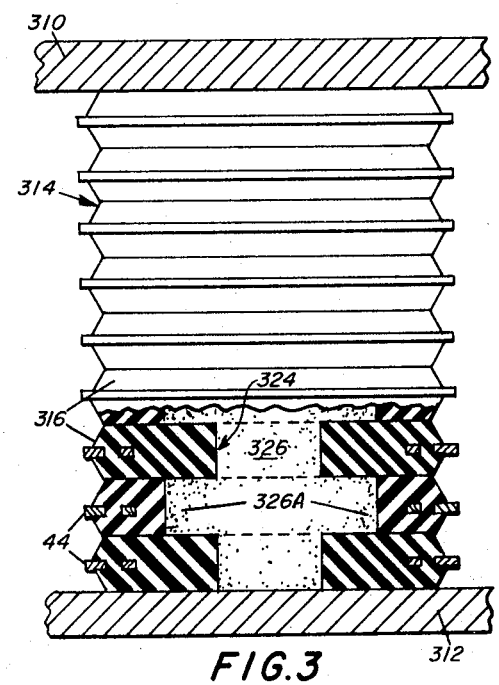
FIG. 3 is an axial section of another embodiment of the invention taken along the line III—III of FIG. 4.

In FIG. 3, stack 314 compresses between plates 310 and 312 under an axially applied load. Discs 316 lie one on the other in face to face relationship and have the configuration shown in FIGS. 4 and 5. Each of discs 316 is provided with an aperture 318 having the shape of a rhombus, as best shown in FIG. 4. Each disc 316 is rotated 90° with respect to adjacent discs 316 so apertures 318 and 318' cross each other at right angles as shown in FIGS. 3 and 4. The body of core 326 corresponds to the area of the apertures 318 which overlay each other while undercut enlargements 326A correspond to areas which do not overlay each other. In contrast to the microcellular polyurethane in the enlargements of the embodiment of FIG. 1, the microcellular polyurethane enlargements 326A act on alternate discs 316 instead of adjacent discs with the result that discs between the alternate discs will be decompressed.

Figure 5:
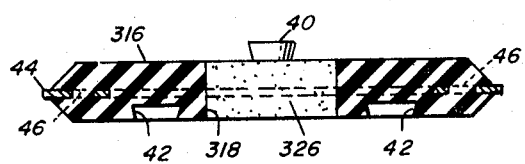
FIG. 5 is a sectional view of one disc of the embodiment of FIG. 4 taken along the line V—V of FIG. 4.

In the embodiment of FIGS. 3, 4 and 5, reciprocal centering means are provided to insure the correct angle arrangement of 318 and 318' shown in FIG. 4. A pair of diametrically opposed buttons 40 projecting from one face of disc 316 and a pair of diametrically opposed cavities 42, projecting from the opposite face of disc 316 are provided with the diameter of buttons 40 crossing at a right angle with the diameter passing through the cavities as shown in FIG. 4. With this arrangement, when buttons 40 are inserted in cavities 42 of an adjacent disc 316, the respective apertures 318 are necessarily set in a crosswise fashion with respect to each other thereby avoiding any chance of mistake when assembling discs 316 for casting of core 326.

The stack can also be reinforced against excessive outward deformation. As shown best in FIGS. 4 and 5, a circular metal ring 44 having a series of holes 46 therethrough may be embedded around the outside edge of disc 316 to act as a reinforcement in the stretched area of disc 316.

Still another embodiment of the invention is illustrated in FIGS. 6 to 8. Rubber discs 616 are assembled in face to face relationship to form a stack 614. Each disc 616 is provided with three apertures or windows 618 aligned axially to form three bores extending axially through the stack. The discs can contain more than three apertures 618, if desired. Each bore is filled with microcellular polyurethane foam core 626. Cores 626 are spaced at regular intervals around the axis of disc 616 and have the configuration shown in FIGS. 6 to 8. Three buttons 640 and three cavities 642 are provided on each disc 616 to combine with similar buttons and cavities on adjacent discs 616 to align the discs 316 axially in stack 614. Core 626 has collar-shaped enlargements filling undercuts 626A between each pair of adjacent discs 616. Pin 630 in cavity 628 of each core 626 centers stack 614 between plates 610 and 612.

In the embodiment of both FIG. 1 and FIG. 6, the depth of the frontal cavities 28 and 628 should be only a small fraction of the total height of the stack and, preferably, not penetrate more than the thickness of two dics.

Figure 9:
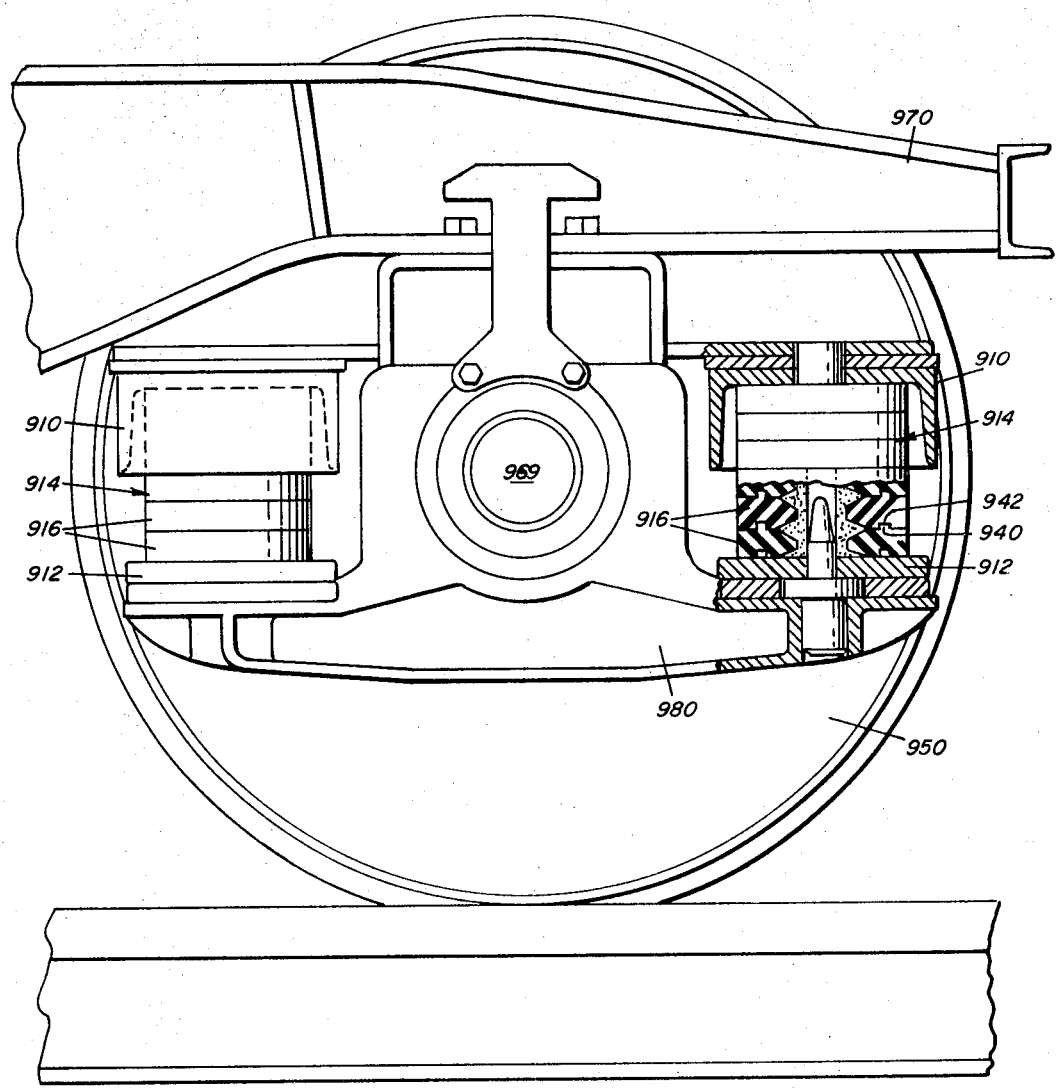
FIG. 9 is a plan view, partially in section, of a railroad wheel suspension assembly provided with an embodiment of the invention.

A pair of the springs of FIG. 1 are illustrated in a suspension system for a railroad car in FIG. 9. Wheel 950 is mounted on axle 969. The spring complex is composed of a stack 914 of rubber discs 916 between metal plates 910 and 912 of the suspension assembly. Circular rib 940 fits into annular groove 942 of the adjacent disc 916. The spring compresses and expands as load is applied from side frame 970 to plate 910. The lower end of stack 914 is supported by rigid arm 980 from the bearing around axle 969.

Comparative tests have been made in railroad suspension systems with the embodiments of the invention shown in FIGS. 1 and 9 and stacks of similar rubber discs without the microcellular polyurethane core. It was found after five months testing in actual operation that the spring complex of this invention showed only about 60% of the amount of permanent deformation of the spring complexes not having the microcellular core. During the test, it was necessary to frequently adjust the spring complex not having the microcellular core because of distortion. No adjustment of the spring complex having the microcellular core was required.

Figure 10:
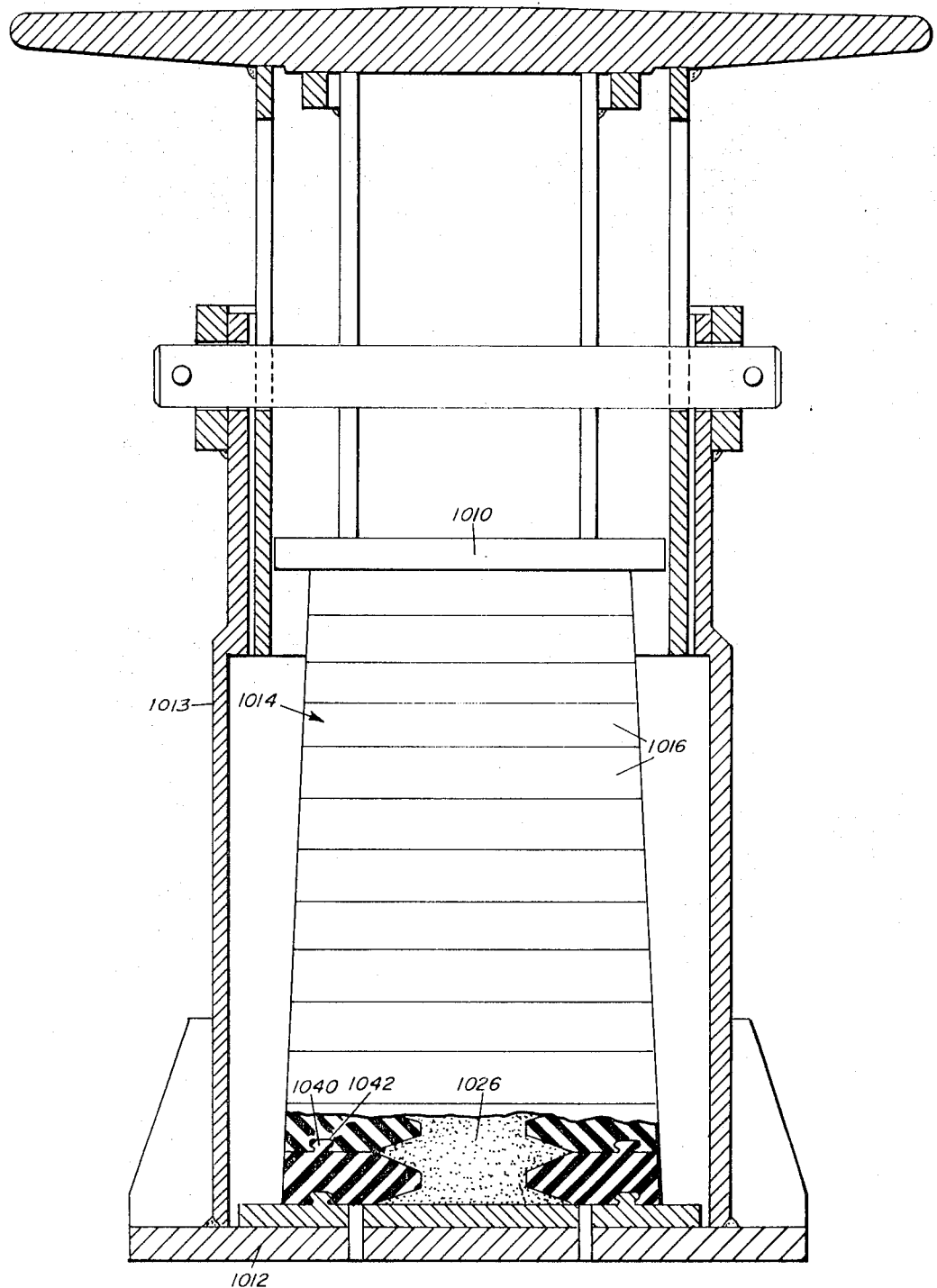
FIG. 10 is an embodiment of a railroad car buffer or bumper provided by this invention.

In FIG. 10, bumper 1013 for railroad cars is shown. It is provided with stack 1014 of discs 1016 between plates 1012 and 1014 which compresses under the load applied when the buffer 1010 of one railroad car strikes one of another car. Stack 1014 is similar to stack 214 of FIG. 2. Discs 1016 have center core 1026 and are attached to each other by buttons 1040 in cavities 1042.

Although the invention has been described in detail for the purpose of illustration, it is to be understood that such detail is solely for that purpose and that variations can be made by those skilled in the art without departing from the spirit and scope of the invention.

The embodiment of the invention in which an exclusive property or privilege is claimed are defined as follows:

1. A shock absorber comprising a stack of elastomeric discs lying one on the other in face to face relationship, each having a hole therethrough aligned with a hole in adjacent discs forming an axially extending bore through the stack, the cross-sectional dimension of each hole being greatest adjacent each surface of the disc to provide axially spaced undercut enlargements of the bore, and a flexible plastic foam core filling said bore and uniting said discs into a unitary structure.

2. The shock absorber of claim 1 wherein said discs are substantially non-porous, the foam core has a lower modulus of elasticity, lower damping coefficient and a higher degree of resiliency than the said discs.

3. The shock absorber of claim 2 wherein said discs are rubber.

4. The shock absorber of claim 2 wherein adjacent discs have reciprocal centering means.

5. The shock absorber of claim 2 wherein said enlargements of the core are all alike, have a cross-section less than that of the discs, and alternate enlargements extend radially at right angles to each other.

6. The shock absorber of claim 5 wherein said core is flexible high density polyurethane foam.

7. The shock absorber of claim 2 with a rigid container thereabout larger in cross-section than said spring thereby providing an annular free space between the spring and container.

8. A shock absorber comprising a stack of elastomeric discs lying one on the other in face to face relationship, each having a hole therethrough aligned with a hole in adjacent discs forming a bore which extends longitudinally through the stack, said bore having longitudinally spaced enlargements thereof, and a flexible plastic foam core filling said bore and uniting said discs into a unitary structure.

9. The shock absorber of claim 8 wherein a plurality of said cores are equally spaced about the geometrical axis of the stack.

10. The shock absorber of claim 9 wherein each enlargement has the shape in cross-section of a rhombus.

11. The shock absorber of claim 9 wherein adjacent surfaces of said discs in said stack are provided with protrusions and cavities spaced when joined together to require said enlargements to extend radially at right angles to each other.

12. The shock absorber of claim 8 having a substantially frusto-conical shape stack, and a substantially cylindrical container whereby the said space decreases from one end of the stack to the other.

References Cited

UNITED STATES PATENTS

| | | | |
|---|---|---|---|
| 3,134,585 | 5/1964 | Trask | 267—153 |
| 3,144,247 | 8/1964 | Szonn et al. | 267—63 |
| 3,227,288 | 1/1966 | Mulcahy et al. | 213—45 |
| 3,262,693 | 7/1966 | Hirst | 267—153 |
| 3,434,708 | 3/1969 | Hawk Jr. | 267—153 |

DRAYTON E. HOFFMAN, Primary Examiner

U.S. Cl. X.R.

213—40; 248—358; 267—140, 152, 153